United States Patent
Liu et al.

(10) Patent No.: US 11,930,205 B2
(45) Date of Patent: *Mar. 12, 2024

(54) SIDE MOTION REFINEMENT IN VIDEO ENCODING/DECODING SYSTEMS

(71) Applicant: Telefonaktiebolaget LM Ericsson (publ), Stockholm (SE)

(72) Inventors: Du Liu, Solna (SE); Rickard Sjöberg, Stockholm (SE); Jacob Ström, Stockholm (SE); Ruoyang Yu, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 33 days.

This patent is subject to a terminal disclaimer.

(21) Appl. No.: 17/567,372

(22) Filed: Jan. 3, 2022

(65) Prior Publication Data
US 2022/0124362 A1    Apr. 21, 2022

Related U.S. Application Data

(63) Continuation of application No. 16/639,777, filed as application No. PCT/SE2019/051254 on Dec. 9, 2019, now Pat. No. 11,252,431.
(Continued)

(51) Int. Cl.
*H04N 19/513* (2014.01)
*H04N 19/577* (2014.01)

(52) U.S. Cl.
CPC ......... *H04N 19/513* (2014.11); *H04N 19/577* (2014.11)

(58) Field of Classification Search
CPC ............................ H04N 19/513; H04N 19/577
(Continued)

(56) References Cited

U.S. PATENT DOCUMENTS 10,375,413 B2   8/2019  Li et al.
2010/0054338 A1*  3/2010  Suzuki .................. H04N 19/33
                                                        375/E7.125
(Continued)

FOREIGN PATENT DOCUMENTS

CN    108028929 A    5/2018
CO     14007528 A    1/2014
(Continued)

OTHER PUBLICATIONS

E. Alshina and .A. Alshin, "Bi-directional optical flow," Joint Collaborative Team on Video Coding (JCT-VC) of ITU-T SG16 WP3 and ISO/IEC JTC1/SC29/WG11, JCTVC-C204, Guangzhou, China, Oct. 10-15, 2010.
(Continued)

*Primary Examiner* — Allen C Wong
(74) *Attorney, Agent, or Firm* — Sage Patent Group

(57) ABSTRACT

A method for decoding a current block in a current picture of a video bitstream includes decoding, from the video bitstream, a first motion vector for the current block relative to a first reference block of a first reference picture having a first picture order count, and decoding, from the video bitstream, a second motion vector for the current block relative to a second reference block of a second reference picture having a second picture order count. A similarity metric is generated based on a comparison of the first motion vector and the second motion vector. The method further includes determining whether to refine the first motion vector based on the similarity metric, generating a first refined motion vector from the first motion vector, and performing motion compensation to derive a first reference block from the first reference picture using the first refined motion vector.

28 Claims, 10 Drawing Sheets

Related U.S. Application Data

(60) Provisional application No. 62/787,587, filed on Jan. 2, 2019.

(58) Field of Classification Search
 USPC .................................................. 375/240.15
 See application file for complete search history.

(56) References Cited

U.S. PATENT DOCUMENTS

| | | | |
|---|---|---|---|
| 2013/0101042 | A1 | 4/2013 | Sugio et al. |
| 2013/0342644 | A1 | 12/2013 | Rusanovskyy et al. |
| 2014/0301463 | A1 | 10/2014 | Rusanovskyy et al. |
| 2016/0073111 | A1 | 3/2016 | Lee et al. |
| 2016/0269639 | A1* | 9/2016 | Chang ............... H04N 23/6811 |
| 2016/0286230 | A1 | 9/2016 | Li et al. |
| 2018/0192071 | A1 | 7/2018 | Chuang et al. |
| 2018/0262773 | A1 | 9/2018 | Chuang et al. |
| 2018/0278949 | A1* | 9/2018 | Karczewicz ........... H04N 19/44 |
| 2018/0316929 | A1 | 11/2018 | Li et al. |
| 2018/0359486 | A1 | 12/2018 | Lai et al. |
| 2018/0376166 | A1 | 12/2018 | Chuang et al. |
| 2019/0110058 | A1 | 4/2019 | Chien et al. |

FOREIGN PATENT DOCUMENTS

| | | | |
|---|---|---|---|
| EP | 3264768 | A1 | 1/2018 |
| JP | 2020-108012 | A | 7/2020 |
| WO | 2012172113 | A1 | 12/2012 |
| WO | 2017036414 | A1 | 3/2017 |
| WO | 2019001737 | A1 | 1/2019 |
| WO | 2019001785 | A1 | 1/2019 |
| WO | 2019072371 | A1 | 4/2019 |
| WO | 2019072373 | A1 | 4/2019 |
| WO | 2019105536 | A1 | 6/2019 |

OTHER PUBLICATIONS

A., Alexander, and E. Alshina, "Bi-directional pptical flow for future video codec." In Data Compression Conference (DCC), 2016, pp. 83-90. IEEE, 2016.

Extended European Search Report dated Oct. 25, 2022 for European Patent Application No. 19907770.2, 12 pages.

Office Action dated Oct. 18, 2022 for Japanese Patent Application No. 2021-538229, 5 pages.

Alshina et al.; "Known Tools Performance Investigation for Next Generation Video Coding"; ITU—Telecommunications Standardization Sector, Study Group 16 Question 6, Video Coding Experts Group (VCEG), Document VCEG-AZ05; 52nd Meeting; Jun. 19-26, 2015; 7 pages.

Esenlik et al.; "CE9: DMVR with Motion Vector Difference Mirroring (Test 1.6)", Joint Video Experts Team (JVET) of ITU-T SG 16 WP 3 and ISO/IEC JTC 1/SC 29/WG 11, JVET-K0216-v3; Jul. 10-18, 2018; 6 pages.

Esenlik et al.; "Simplified DMVR for Inclusion in VVC"; Joint Video Experts Team (JVET) of ITU-T SG 16 WP 3 and ISO/IEC JTC 1/SC 29/WG 11, JVET-L0670; Oct. 3-12, 2018; 5 pages.

Liu et al.; "CE9-Related: Disabling DMVR and BDOF When Underlying Assumptions are False"; Joint Video Experts Team (JVET) of ITU-T SG 16 WP 3 and ISO/IEC JTC 1/SC 29/WG 11, JVET-N0440; Mar. 19-27, 2019; 2 pages.

Liu et al.; "CE9-Related: Motion Vector Refinement in Bi-Directional Optical Flow"; Joint Video Experts Team (JVET) of ITU-T SG 16 WP 3 and ISO/IEC JTC 1/SC 29/WG 11, JVET-L0333-v1; Oct. 3-12, 2018; 3 pages.

Examination Report dated Mar. 10, 2022 for Indian Patent Application No. 202147034075, 6 pages.

X. Xiu, Y. He, Y. Ye, "CE9-related: Complexity reduction and bit-width control for bi-directional optical flow (BIO)", Input document to JVET, document No. JVET-L0256, Oct. 3-12, 2018, 15 pages.

Office Action dated Dec. 29, 2023 for Colombia Patent Application No. NC2021/0010122, 18 pages (includes English translation).

Yu, Ru and Liu, D.; "Non-CE9: On motion refinement parameter derivation in BDOF"; Joint Video Experts Team (JVET) of ITU-T SG 16 WP 3 and ISO/IEC JTC 1/SC 29/WG 11; Mar. 19-27, 2019; Geneva, Switzerland; 5 pages.

Chinese First Office Action dated Jan. 4, 2024 for Chinese Patent Application No. 201980087686.3, 7 pages.

Huawei Technologies Co., Ltd et al., "Simplified DMVR for inclusion in VVC," Joint Video Experts Team (JVET) of ITU-T SG 106 WP 3 and ISO/IEC JTC 1/SC 29/WG 11, JVET-L0670, 12th Meeting, Macao, China, Oct. 3-12, 2018, 5 pages.

* cited by examiner

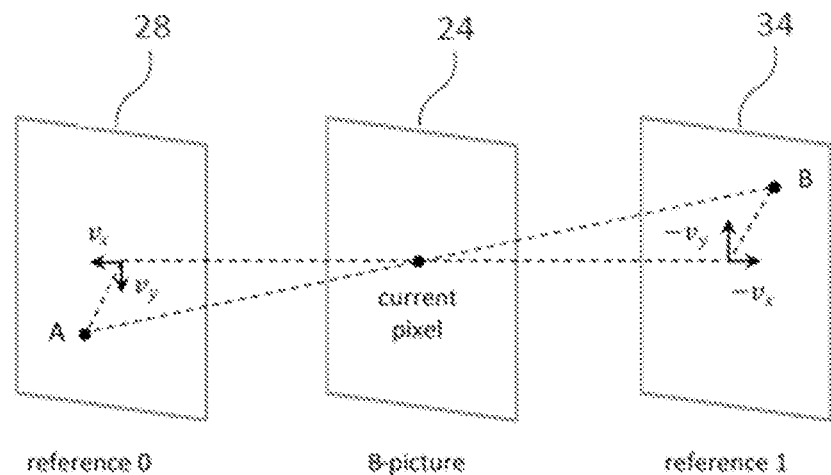
Figure 6
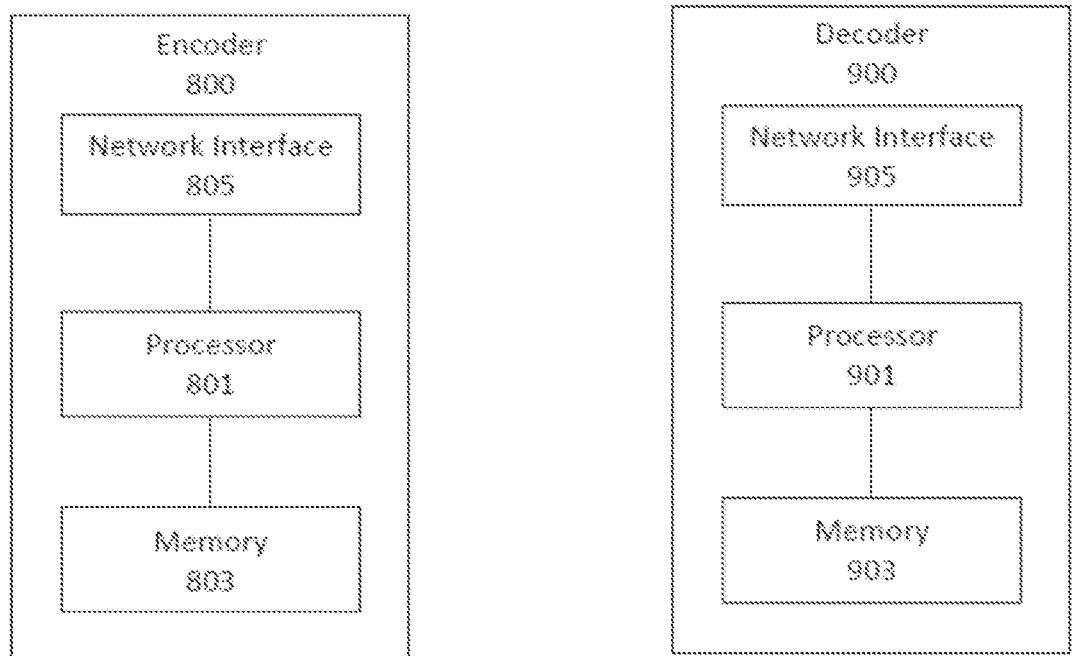
Figure 8
Figure 9

Generate similarity metric based
on mvA and mvB
1402

Figure 14

Generate similarity metric based
on R0 and R1
1502

Figure 15

SIDE MOTION REFINEMENT IN VIDEO ENCODING/DECODING SYSTEMS

CROSS-REFERENCE TO RELATED APPLICATIONS

This application is a continuation of U.S. patent application Ser. No. 16/639,777 filed on Feb. 18, 2020, which is a 35 U.S.C. § 371 national stage application of PCT International Application No. PCT/SE2019/051254, filed on Dec. 9, 2019, which claims benefit of U.S. provisional application 62/787,587, filed on Jan. 2, 2019 the disclosures and contents of which are incorporated herein by reference in their entireties.

TECHNICAL FIELD

The application relates to methods and apparatus for video encoding and decoding.

BACKGROUND

A video sequence contains a sequence of pictures. Each picture is assigned a Picture Order Count (POC) value that indicates its display order in the sequence.

Each picture in the sequence includes one or more components. Each component can be described as a two-dimensional rectangular array of sample values. Typically, an image in a video sequence consists of three components: one luma component Y, where the sample values are luma values, and two chroma components Cb and Cr, where the sample values are chroma values. Other examples include Y' Cb Cr, YUV and ICTCP. In ICTCP, I is the "intensity luma" component. In the description that follows, any luma component Y', Y or I will be referred to as Y or simply luma. Typically, the dimensions of the chroma components are smaller than the luma components by a factor of two in each dimension. For example, the size of the luma component of a High Density (HD) image would be 1920×1080 and the chroma components would each have the dimension of 960×540. Chroma components are sometimes referred to as color components.

Video coding is used to compress a video sequence into a sequence of coded pictures. Usually, a picture is divided into blocks with sizes ranging from 4×4 to 128×128. The blocks serve as the basis for coding. A video decoder then decodes the coded pictures into pictures containing sample values.

A block is a two-dimensional array of samples. In video coding, each component is split into blocks and the coded video bitstream consists of a series of blocks. Typically, in video coding, the image is split into units that cover a specific area of the image. Each unit consists of all blocks from all components that make up that specific area and each block belongs to one unit. The macroblock in H.264 and the Coding unit (CU) in High Efficiency Video Coding (HEVC) are examples of units.

The draft VVC video coding standard uses a block structure referred to as quadtree plus binary tree plus ternary tree block structure (QTBT+TT) where each picture is first partitioned into square blocks called coding tree units (CTU). The size of all CTUs are identical and the partition is done without any syntax controlling it. Each CTU is further partitioned into coding units (CU) that can have either square or rectangular shapes. The CTU is first partitioned by a quad tree structure, then it may be further partitioned with equal sized partitions either vertically or horizontally in a binary structure to form coding units (CUs). A block could thus have either a square or rectangular shape. The depth of the quad tree and binary tree can be set by the encoder in the bitstream. An example of dividing a CTU using QTBT is illustrated in FIG. 1. In particular, FIG. 1 shows a picture 12 divided into four CTUs 14. The CTUs are further partitioned into square or rectangular CUs 16. FIG. 1 also shows the QTBT+TT 18 used to partition the picture. The ternary tree (TT) part adds the possibility to divide a CU into three partitions instead of two equally sized partitions; this increases the possibilities to use a block structure that better fits the content structure in a picture.

Inter Prediction

To achieve efficient compression in the temporal domain, inter prediction techniques aim to explore the similarity among pictures. Inter prediction predicts a block in a current picture using previously decoded pictures. The previously decoded pictures are referred to as reference pictures of the current picture.

In a video encoder, a method called motion estimation is typically used to find the most similar blocks in the reference pictures. The displacement between a current block and its reference block is motion vector (MV). An MV has two components, MV.x and MV.y, namely x- and y-directions. FIG. 2 depicts an example of an MV between a current block 22 in a current picture 24 and a reference block 26 in a reference picture 28. The MV is signaled to the decoder in the video bitstream. The current picture 24 has a picture order count POC0, while the reference picture 28 has a picture order count POC1. Note that the POC of the reference picture can be before or after the POC of the current picture (i.e., a current picture can be predicted from a picture that comes after the current picture in the picture order count), because pictures in a video bitstream may be encoded and/or decoded out of their display order.

A video decoder decodes the MV from the video bitstream. The decoder will then apply a method called motion compensation that uses the MV to find the corresponding reference blocks in the reference pictures.

A block is called an inter block if it is predicted from at least one reference block in a reference picture.

Bidirectional Inter Prediction

The number of reference blocks is not limited to one. In bi-directional motion compensation, two reference blocks can be used to further explore the temporal redundancy, i.e., the current block is predicted from two previously decoded blocks. A picture that uses bi-directional motion compensation is called a bi-predicted picture (B-picture). FIG. 3 depicts an example of a block 22 in a current picture 24 with bi-directional motion compensation based on reference blocks 26, 32 in reference pictures 28, 34, respectively. In this example, a first motion vector (MV0) points from point C of the current block to point A of the first reference block 26, while a second motion vector (MV1) points from point C of the current block to point B of the second reference block 32.

A set of motion information contains an MV (MV.x and MV.y) and a reference picture with a POC number. If bi-directional motion compensation is used, there are two sets of motion information, i.e., Set 0 with MV0, POC1, and an associated block 26, and Set 1 with MV1, POC2, and an associated block 32, as shown in FIG. 3.

The temporal distance between the current B-picture and a reference picture can be represented by the absolute POC difference between the pictures. For example, if the reference picture 0 in FIG. 3 is with POC1=0 and the current B-picture with POC0=8, the absolute temporal distance between the two pictures is |POC1−POC0|=8. The signed temporal distance between the two pictures is simply (POC1−POC0)=−8. The negative sign of the signed temporal distance between indicates that the current B-picture comes after the reference picture in the display sequence.

MV Difference and MV Scaling

A common way of comparing the similarity between two MVs is to calculate the absolute MV difference, i.e. |MV0−MV1|. Since both MVs originate at point C, before calculating the MV difference (ΔMV) one of the motion vectors must be rotated 180 degrees, as shown in FIGS. 4A and 4B (MV0 is rotated 180 degrees to become MV0'). Rotation by 180 degrees can be accomplished by simply negating the values of the vector components (e.g., MV0'.x=−MV0.x and MV0'.y=−MV0.y). Then a value for ΔMV=(MV1.x−MV0'.x, MV1.y−MV0'.y) can be obtained.

When the absolute temporal distances of the reference pictures associated with the two MVs from the current picture are different, motion vector scaling is needed before the motion vector difference can be calculated.

For example, referring to FIG. 5A, MV0 is associated with reference picture 28 having POC1=10, and MV1 is associated with reference picture 34 having POC2=16. The current picture 24 has POC0=12. Thus assuming ΔPOCN=POCN−POC0, then ΔPOC1=−2 and ΔPOC2=4.

Thus, when comparing the similarity between MV0 and MV1, one of the MVs needs to be scaled first by the ratio of ΔPOC2/ΔPOC1=−2.

As can be seen in FIG. 5A, in one aspect, a motion vector MV can be considered as a three dimensional vector having x- and y-components (MV.x, MV.y) within the plane of the picture and a z-component in the time dimension corresponding to the ΔPOC1 associated with the MV.

FIG. 5B shows the x- and y-components of MV0 and MV1 plotted on the same x-y plane, while FIG. 5C shows the scaling of MV0 to account for the different temporal distances from the current picture associated with the two motion vectors.

In the general case when the ΔPOCs are different, the MV scaling depends on the POC differences (ΔPOC2=POC2−POC0) and (ΔPOC1=POC1−POC0). Assuming that MV0 is the vector to be scaled, the components of the scaled vector MV0' may be calculated as $$MV0' \cdot x = MV0 \cdot x \times \frac{(POC2 - POC0)}{(POC1 - POC0)}, \quad (1)$$

$$MV0' \cdot y = MV0 \cdot y \times \frac{(POC2 - POC0)}{(POC1 - POC0)}.$$

Note that in this example, scaling MV0 also has the effect of rotating MV0 by 180 degrees, since the ratio of ΔPOC2/ΔPOC1 has a negative sign.

Bi-Directional Optical Flow (BIO)

The BIO method described in [1] is a decoder side technique to further refine the motion vectors used for bi-directional motion compensation. It uses the concept of optical flow and combines with bi-prediction to predict luminance values in the current block. BIO is applied after conventional bi-directional motion compensation as pixel-wise motion refinement.

Optical flow assumes that the luminance of the object does not change during a certain motion period. It gives the optical flow equation $$I_x v_x + I_y v_y + I_t \approx 0, \quad (2)$$

where I is the luminance of the pixel, v_x the velocity in the x-direction, v_y the velocity in the y-direction, and $$I_x = \frac{\partial I}{\partial x}, I_y = \frac{\partial I}{\partial y}, \text{ and } I_t = \frac{\partial I}{\partial t}$$

are the derivatives in the x-direction, the y-direction, and with respect to time, respectively. In BIO, the motion is assumed to be steady and the velocity $(v_x, v_y)$ in reference 0 is the opposite to the velocity $(-v_x, -v_y)$ in reference 1, as shown in FIG. 6.

Let the current pixel be at position [i,j] in the B-picture, $I^{(0)}[i,j]$ the luminance at [i,j] in reference 0, $I^{(1)}[i,j]$ the luminance at [i,j] in reference 1. Denote the derivative as $$I_x^{(k)} = \frac{\partial I^{(k)}}{\partial x},$$

where k=0, 1 is the reference index. Based on (2), the authors of [1] defines an error for BIO, i.e., $$e[i,j]=I^{(0)}[i,j]-I^{(1)}[i,j]+v_x(I_x^{(0)}[i,j]+I_x^{(1)}[i,j])+v_y(I_y^{(0)}[i,j]+I_y^{(1)}[i,j]). \quad (3)$$

Then, BIO can be formed into a least-square problem as $$[v_x^*, v_y^*] = \underset{v_x, v_y}{\operatorname{argmin}} \sum_{[i',j'] \in \Omega} e^2[i', j'], \quad (4)$$

where $[i',j'] \in \Omega$ is a subblock containing the neighboring pixels including [i,j] that are used to solve equation (4). The solution to equation (4) gives the optimal expressions $v_x^*$, $v_y^*$ that are based on the derivatives $I_x^{(k)}$, $I_y^{(k)}$ and the luminance difference. An alternative solution would be to use a moving window around [i,j] to calculate the sum in equation (4). However, by using subblocks, two pixels belonging to the same subblock will sum over the same Ω, meaning that the calculation of $[v_x^*, v_y^*]$ can be reused between pixels belonging to the same subblock.

Once the velocities are obtained, the next step is to predict the current pixel from the two references. As shown in FIG. 6, the current pixel is to be predicted from two directions. The authors of [2] introduce a 3rd order polynomial function to interpolate the value between two reference pixels, i.e., $$P(t)=a_0+a_1 t+a_2 t^2+a_3 t^3, \quad (5)$$

where t is the time and a0 to a3 are parameters. Let reference 0 be at time 0, B-picture be at time $\tau_0$, and reference 1 be at $\tau_0+\tau_1$. That is, in FIG. 6, the time difference between reference 0 and B-picture is $\tau_0$, and the time difference between B-picture and reference 1 is $\tau_1$. To find the four parameters, we consider the following four equations $$P(t=0)=I^{(0)}, P(t=\tau_0+\tau_1)=I^{(1)}, P'(t=0)=I_t^{(0)}, P'(t=\tau_0+\tau_1) =I_t^{(1)}. \quad (6)$$

Equation (6) indicates that the interpolation function P(t) needs to match the luminance values $I^{(0)}$ and $I^{(1)}$ as well as the derivatives at t=0 and t=$\tau_0+\tau_1$. With four equations, a0 to a3 can be solved.

In a common case when $\tau_0=\tau_1=\tau$, the interpolation function gives $$P(\tau_0) = \frac{I^{(0)} + I^{(1)}}{2} + \frac{\tau(I_t^{(0)} - I_t^{(1)})}{4} = \frac{1}{2}\left(I^{(0)} + \frac{\tau I_t^{(0)}}{2}\right) + \frac{1}{2}\left(I^{(1)} - \frac{\tau I_t^{(1)}}{2}\right). \quad (7)$$

Note that when $I_t^{(0)} \neq I_t^{(1)}$, this is different from the simple linear interpolation which is only the average of $I^{(0)}$ and $I^{(1)}$. Equation (7) can be viewed as refinements on $I^{(0)}$ and $I^{(1)}$, and this refinement helps to improve the interpolation accuracy. Replacing $I_t$ with the optical flow equation $I_t = -I_x v_x - I_y v_y$, equation (7) can be written as $$P(\tau_0) = \frac{I^{(0)} + I^{(1)}}{2} + \frac{\tau(v_x(I_x^{(0)} - I_x^{(1)}) + v_y(I_y^{(0)} - I_y^{(1)}))}{4} \quad (8)$$
$$= \frac{1}{2}\left(I^{(0)} + \frac{\tau(v_x I_x^{(0)} + v_y I_y^{(0)})}{2}\right) +$$
$$\frac{1}{2}\left(I^{(1)} - \frac{\tau(v_x I_x^{(1)} + v_y I_y^{(1)})}{2}\right).$$

From equation (8), the luminance values $I^{(0)}$ and $I^{(1)}$ are known. The derivatives can be estimated from gradient using neighboring pixels. The velocities are solved in equation (4). Therefore, the predicted luminance value $P(\tau_0)$ can be obtained.

In the implementation of BIO described in [3], a criterion is checked in the decoder to indicate whether BIO should be considered. The criterion is set to TRUE if all of the following conditions hold; a) the prediction is bi-directional and coming from opposite directions (e.g., POC1<POC0 and POC2>POC0), b) the affine motion model is not used, and c) the advanced temporal motion prediction (ATMVP) is not used. If any of the conditions a) through c) does not hold, the criterion is set to FALSE.

As shown in equation (4), each pair of $(v_x, v_y)$ in BIO is computed using a subblock $\Omega$. For two pixels belonging to the same subblock, the same $(v_x, v_y)$ vector is used in the BIO refinement. In the implementation, the subblock has a size of 4×4. For example, if a block is of size 128×128, it contains 32×32=1024 subblocks and has 1024 pairs of $(v_x, v_y)$.

When the criterion of BIO is TRUE, the sum of absolute difference (SAD) between the two reference blocks is computed. The SAD is obtained by computing the absolute difference for every pixel between the two reference blocks. In addition, the SAD_sub between the two reference sub-blocks (both with sizes 4×4) is also computed. Then, BIO is applied when SAD and SAD_sub are larger than certain thresholds, respectively. These thresholds depend on the block sizes and the bit-depth. On the other hand, if BIO is not applied, linear averaging is used to predict the signal.

Other motion vector refinement techniques are known, such as decoder-side motion vector refinement (DMVR). In DMVR, a bilateral template is generated as the weighted combination of two reference blocks associated with initial motion vectors. Bilateral template matching is then performed to find the best matched blocks in the reference pictures and identify updated motion vectors.

SUMMARY

A first aspect of the embodiments defines method, performed by a decoder, for decoding a current block in a current picture of a video bitstream. The current picture has a current picture order count. The method comprises decoding, from the video bitstream, a first motion vector for the current block relative to a first reference block of a first reference picture having a first picture order count. The method comprises decoding, from the video bitstream, a second motion vector for the current block relative to a second reference block of a second reference picture having a second picture order count. The method further comprises generating a similarity metric based on a comparison of the first motion vector and the second motion vector. The method further comprises determining whether to refine the first motion vector based on the similarity metric. Responsive to determining whether to refine the first motion vector, the method further comprises generating a first refined motion vector from the first motion vector. The method further comprises performing motion compensation to derive a first reference block from the first reference picture using the first refined motion vector.

A second aspect of the embodiments defines a decoder, for decoding a current block in a current picture of a video bitstream, for a communication network according to some embodiments. The decoder includes a processor circuit and a memory coupled with the processor circuit. The memory includes instructions that, when executed by the processor circuit, cause the processor circuit to perform the operations according to the first aspect.

A third aspect of the embodiments defines a computer program for a decoder. The computer program comprises computer-executable instructions configured to cause the decoder to perform the operations according to the second aspect, when the computer-executable instructions are executed on a processor circuit included in the decoder.

A fourth aspect of the embodiments defines a computer program product comprising a non-transitory storage medium including program code to be executed by at least one processor of a decoder, whereby execution of the program code causes the decoder to perform a method according to any of the first aspect.

A fifth aspect of the embodiments defines a method, performed by a video encoder, for encoding a current block in a current picture of a video bitstream. The current picture has a current picture order count. The method comprises generating a first motion vector for the current block relative to a first reference block of a first reference picture having a first picture order count. The method comprises generating a second motion vector for the current block relative to a second reference block of a second reference picture having a second picture order count. The method further comprises generating a similarity metric based on a comparison of the first motion vector and the second motion vector. The method further comprises determining whether to refine the first motion vector based on the similarity metric. Responsive to determining whether to refine the first motion vector, the method further comprises generating a first refined motion vector from the first motion vector. The method further comprises performing motion compensation to derive a first reference block from the first reference picture using the first refined motion vector.

A sixth aspect of the embodiments defines an encoder, for encoding a current block in a current picture of a video bitstream. The encoder comprises a processor circuit, and a memory coupled with the processor circuit, wherein the memory includes instructions that when executed by the processor circuit cause the processor circuit to perform the operations according to the fourth aspect.

A seventh aspect of the embodiments defines a computer program for an encoder. The computer program comprises computer-executable instructions configured to cause the encoder to perform the operations according to the fifth aspect, when the computer-executable instructions are executed on a processor circuit included in the encoder.

An eighth aspect of the embodiments defines a computer program product comprising a non-transitory storage medium including program code to be executed by at least one processor of an encoder, whereby execution of the program code causes the encoder to perform a method according to any of the fifth aspect.

One potential advantage that may be provided by the inventive concepts includes reducing the computational complexity of the criteria for determining whether motion vector refinement, such as using the BIO processing algorithm, should be undertaken during encoding and/or decoding of a video sequence. This may save processing resources and/or reduce the time needed to encode or decode a video sequence. In addition, some embodiments described herein may have negligible impact on compression efficiency.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 6 illustrates an example of bi-directional optical flow processing;

FIG. 8 is a block diagram illustrating an encoder according to some embodiments;

FIG. 9 is a block diagram illustrating a decoder according to some embodiments;

FIGS. 10-15 are flow charts illustrating operations of a decoder or an encoder in accordance with some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As described above, BIO processing may be applied after conventional bi-directional motion compensation as a pixel-wise motion refinement. As described in [3], BIO is enabled when the SAD and SAD_sub are larger than certain thresholds. However, one drawback of computing SAD is that it requires many arithmetic operations. To compute the SAD between two blocks of size n×n, $n^2$ subtractions, $n^2$ absolute values, and $n^2-1$ additions are needed. As an example of the worst case, if the block size is n=128, the number of operations is $128^2$=16384 subtractions, $128^2$=16384 absolute values, and $128^2-1$=16383 additions. This is costly in terms of computation.

Another drawback is that the solution given in equation (8) is only valid for equal temporal distances $\tau\_0=\tau\_1$. As explained above, in video coding, the B-picture can have two reference pictures with different temporal distances, that is, $\tau\_0 \neq \tau\_1$ or $|POC0-POC1| \neq |POC0-POC2|$. However, in the implementation [3], the solution in equation (8) is applied to all BIO cases regardless of the POC difference. Therefore, there is an inconsistency between the theoretical solution and the practical implementation, which could lead to an inefficiency in the BIO method.

Some embodiments provide alternate criterion for determining whether or not to perform BIO or other motion vector refinement techniques as part of an encoding or decoding process.

Figure 1:
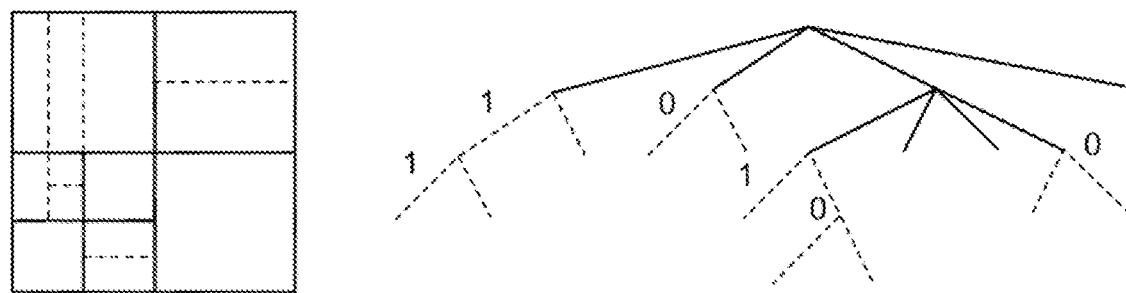
FIG. 1 is a block diagram illustrating partitioning of a picture into coding units.
Figure 2:
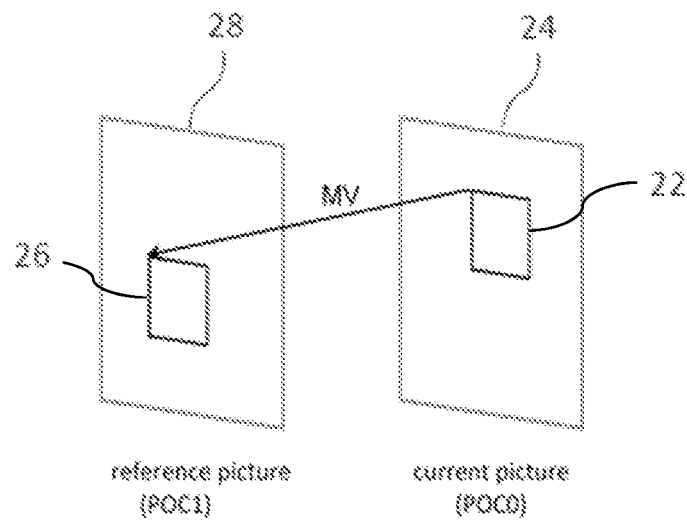
FIG. 2 is a block diagram illustrating an example of the use of motion vectors for encoding/decoding a block based on a reference block.
Figure 3:
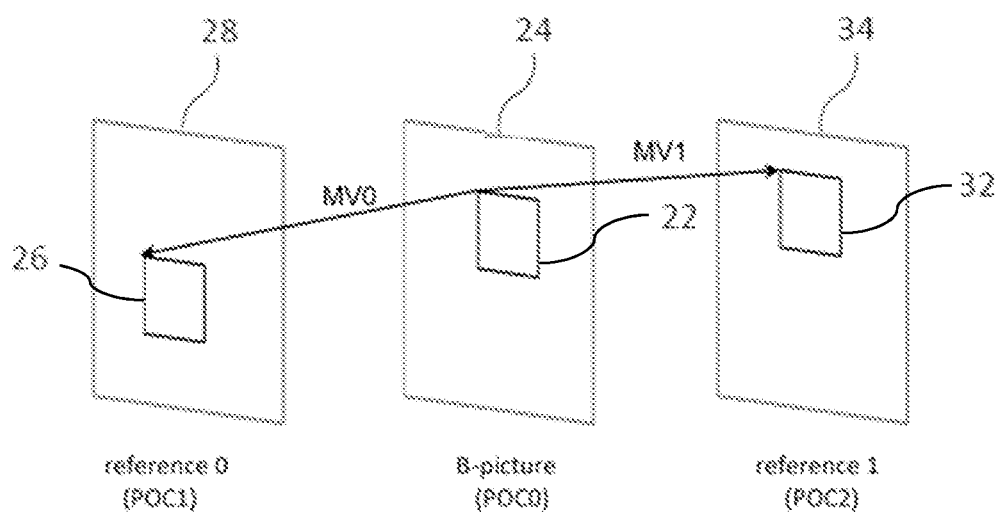
FIG. 3 is a block diagram illustrating an example of a bi-directional motion compensation.
Figure 4A:
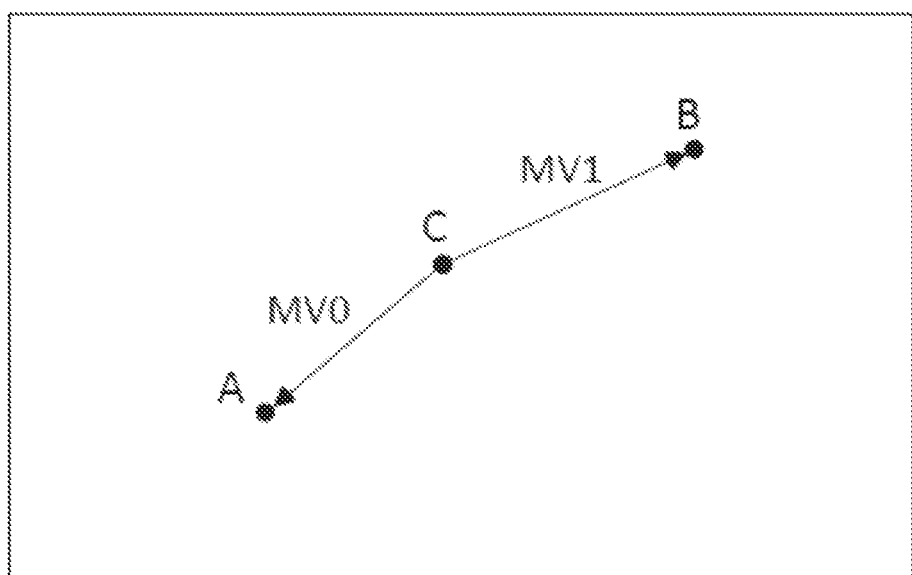
FIGS. 4A and 4B illustrate the comparison of two motion vectors.
Figure 4B:
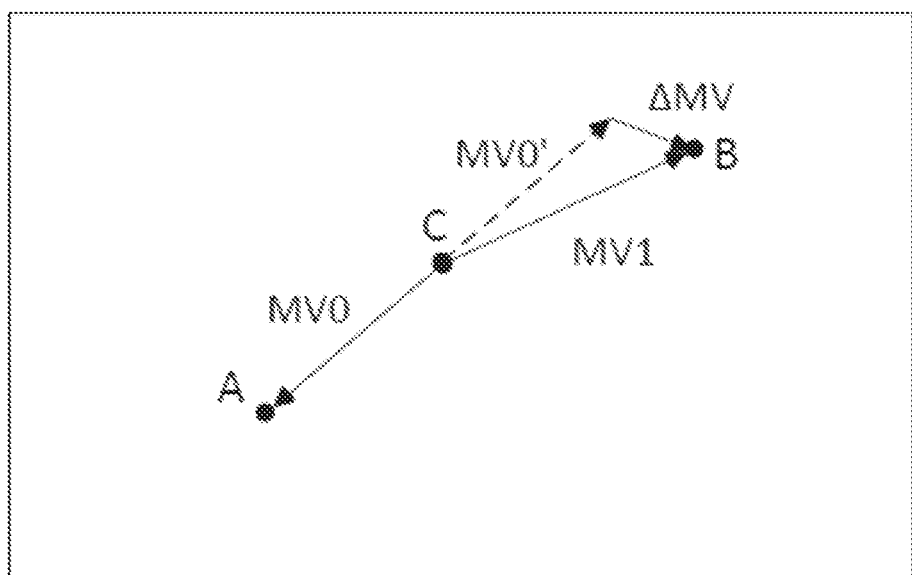
Figure 5A:
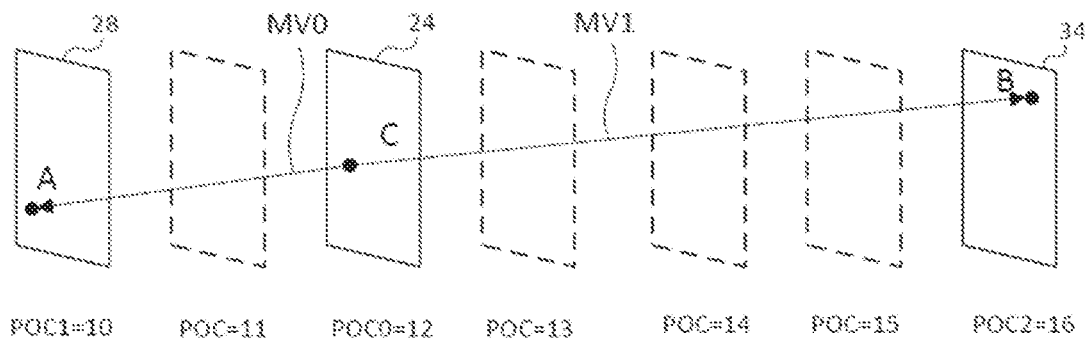
FIGS. 5A, 5B and 5C illustrate the scaling and comparison of scaled motion vectors.
Figure 5B:
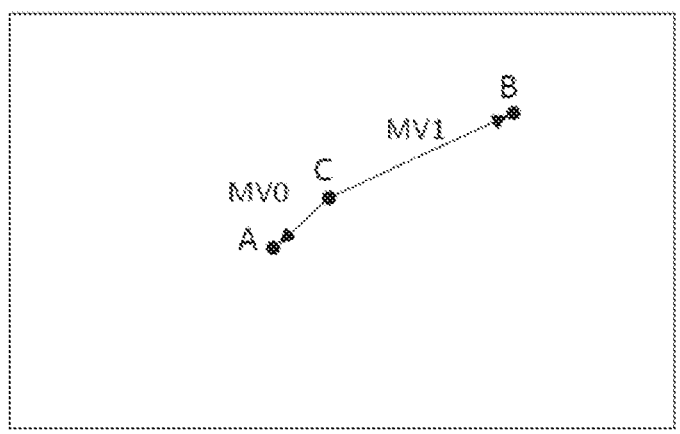
Figure 5C:
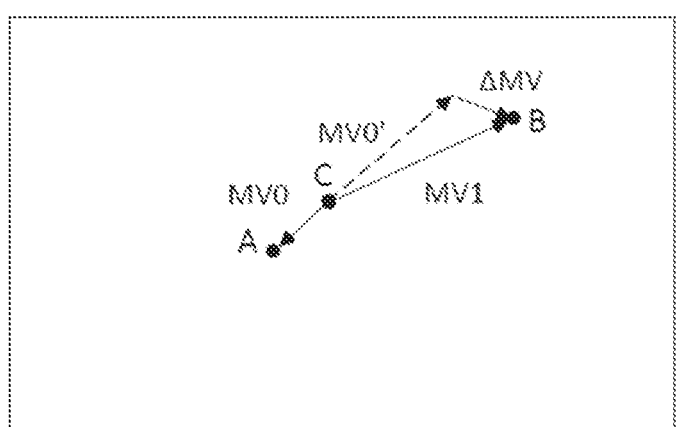
Figure 7:
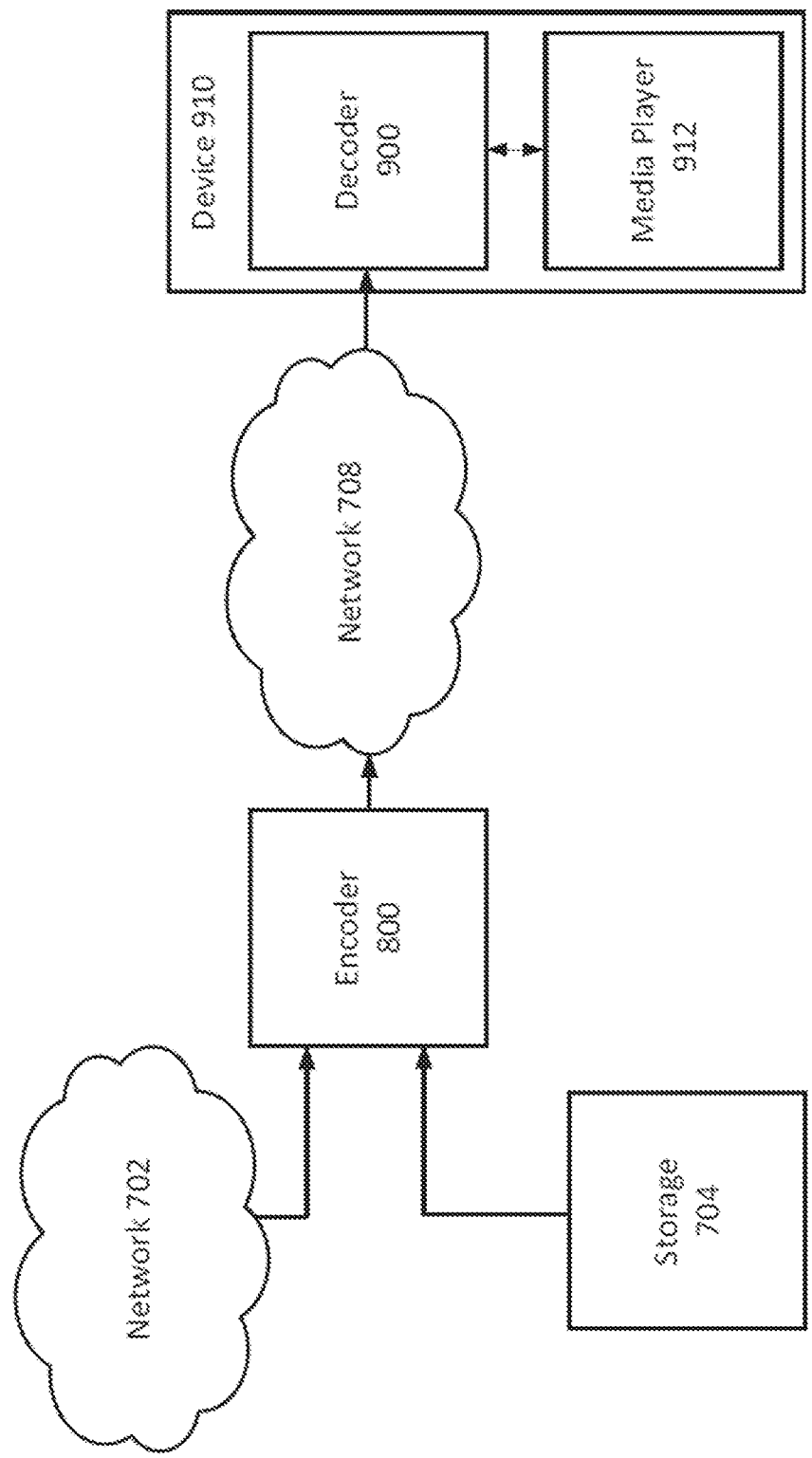
FIG. 7 is a block diagram illustrating an example of an environment of a system in which the encoder and decoder may be implemented according to some embodiments of inventive concepts.

FIG. 7 illustrates an example of an operating environment of an encoder 800 that may be used to encode bitstreams as described herein. The encoder 800 receives video from network 702 and/or from storage 704 and encodes the video into bitstreams as described below and transmits the encoded video to decoder 900 via network 708. Storage device 704 may be part of a storage depository of multi-channel audio signals such as a storage repository of a store or a streaming video service, a separate storage component, a component of a mobile device, etc. The decoder 900 may be part of a device 910 having a media player 912. The device 910 may be a mobile device, a set-top device, a desktop computer, and the like.

FIG. 8 is a block diagram illustrating elements of encoder 800 configured to encode video frames according to some embodiments of inventive concepts. As shown, encoder 800 may include a network interface circuit 805 (also referred to as a network interface) configured to provide communications with other devices/entities/functions/etc. The encoder 900 may also include a processor circuit 801 (also referred to as a processor) coupled to the network interface circuit 805, and a memory circuit 803 (also referred to as memory) coupled to the processor circuit. The memory circuit 803 may include computer readable program code that when executed by the processor circuit 801 causes the processor circuit to perform operations according to embodiments disclosed herein.

According to other embodiments, processor circuit 801 may be defined to include memory so that a separate memory circuit is not required. As discussed herein, operations of the encoder 800 may be performed by processor 801 and/or network interface 805. For example, processor 801 may control network interface 805 to transmit communications to decoder 900 and/or to receive communications through network interface 802 from one or more other network nodes/entities/servers such as other encoder nodes, depository servers, etc. Moreover, modules may be stored in memory 803, and these modules may provide instructions so that when instructions of a module are executed by processor 801, processor 801 performs respective operations.

FIG. 9 is a block diagram illustrating elements of decoder 900 configured to decode video frames according to some embodiments of inventive concepts. As shown, decoder 900 may include a network interface circuit 905 (also referred to as a network interface) configured to provide communications with other devices/entities/functions/etc. The decoder 900 may also include a processor circuit 901 (also referred to as a processor) coupled to the network interface circuit 905, and a memory circuit 903 (also referred to as memory) coupled to the processor circuit. The memory circuit 903 may include computer readable program code that when executed by the processor circuit 901 causes the processor circuit to perform operations according to embodiments disclosed herein.

According to other embodiments, processor circuit 901 may be defined to include memory so that a separate memory circuit is not required. As discussed herein, operations of the decoder 900 may be performed by processor 901 and/or network interface 905. For example, processor 901 may control network interface 905 to receive communications from encoder 900. Moreover, modules may be stored in memory 903, and these modules may provide instructions so that when instructions of a module are executed by processor 901, processor 901 performs respective operations.

Some embodiments of the inventive concepts adjust the condition and simplifies the computations of the criterion for enabling BIO during encoding and/or decoding of a video sequence.

Decoder Operations

Figure 10:
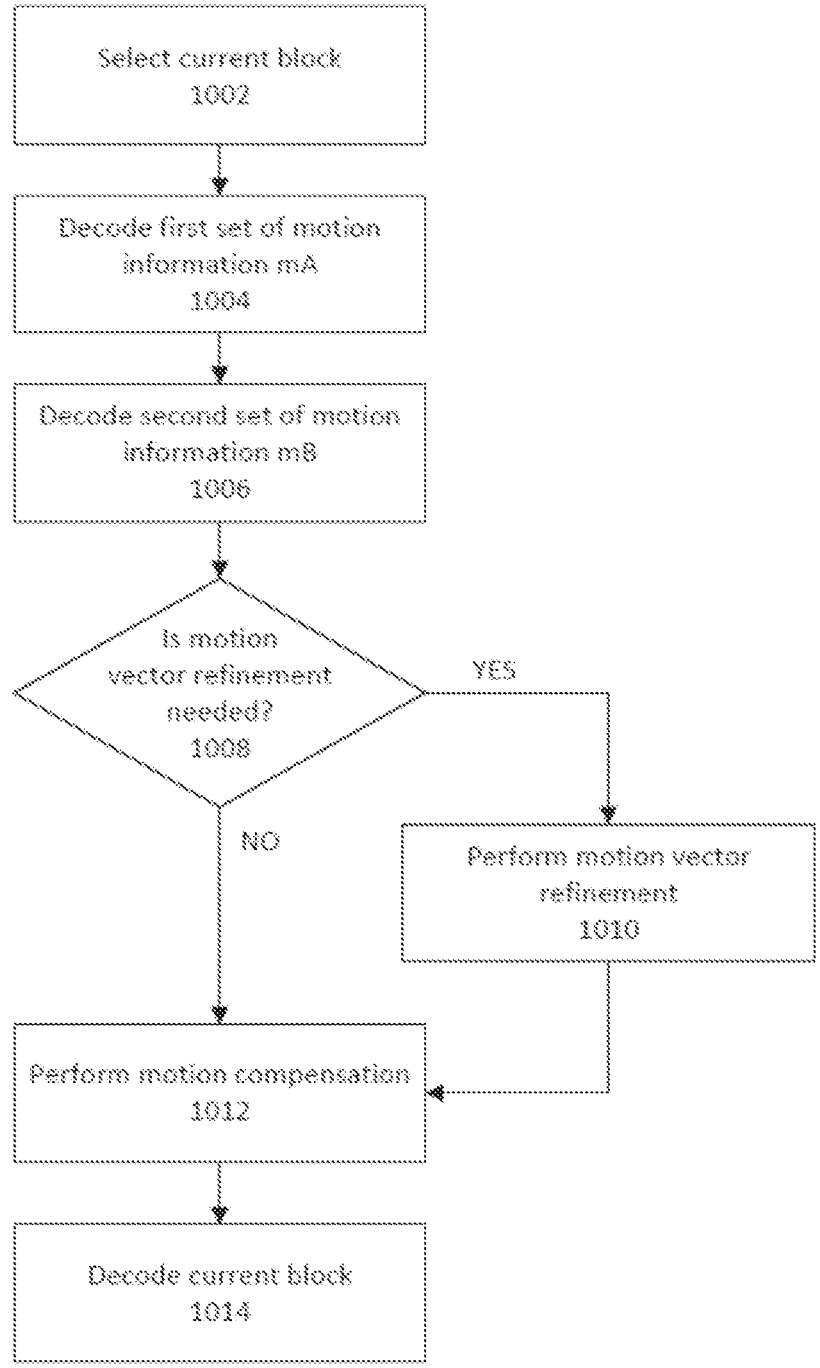

FIG. 10 illustrates operations of a decoder 900 for decoding a video bitstream according to some embodiments. Referring to FIG. 10, the decoder 900 first selects a current block K in a current picture having POC equal to POCn for processing (block 1002). The current picture is a B-picture that uses bidirectional prediction for decoding.

The decoder 900 then decodes one set of motion information mA from the video bitstream, where mA contains a motion vector mvA and the first reference picture refA with POC equal to POCa (block 1004).

The decoder 900 then decodes another set of motion information mB from the video bitstream, where mB contains a motion vector mvB and reference picture refB with POC equal to POCb (block 1006).

Next, the decoder 900 determines whether further refinement to mvA and/or mvB is needed based on some criterion C (block 1008). The criterion C may in some embodiments be based on a comparison of one or more components of the motion vectors mvA, mvB, including comparison of their x-components, their y-components and/or their z-components (e.g., their ΔPOCs). In other embodiments, the criterion may be based on comparison of the reference blocks associated with the motion vectors.

When the criterion C is met, further refinement is carried out for mvA and/or mvB (block 1010). The refinement results in two new motion vectors mvA*, mvB*. These motion vectors mvA* and mvB* are then used in the motion compensation process to derive the corresponding reference blocks for predicting the sample values of block K (block 1012).

When the criterion C is not met, no further refinement is carried out for mvA and mvB. Both mvA and mvB are directly used in the motion compensation process to find the corresponding reference blocks for predicting the sample values of block K.

Finally, the decoder 900 decodes the current block using the reference blocks (block 1014).

In some embodiments, the criterion C may include comparing the similarity between mvA and mvB. The similarity may be measured as described above by calculating the motion vector difference ΔMV between mvA and mvB, where one of the MVs is rotated by 180 degrees. Then, the ΔMV can be calculated by taking absolute differences in x and y directions, i.e. $\Delta MV.x=|mvA.x-mvB.x|$, $\Delta MV.y=|mvA.y-mvB.y|$.

In some embodiments, a motion vector scaling according to equation (1) may be involved when calculating the motion vector difference. When only one MV is scaled, then $|\Delta MV|$ will be different depending on which MV is scaled. In some embodiments, the choice of which motion vector to scale may be based on the relative magnitudes of the motion vectors. For example, if $|mvA|<|mvB|$, then mvA may be selected for scaling, or vice-versa.

In other embodiments, both the motion vectors may be scaled as follows:

$$mvA'=mvA/\Delta POCa$$

$$mvB'=mvB/\Delta POCb \quad (9)$$

where $\Delta POCa=POCa-POCn$ and $\Delta POCb=POCb-POCn$.

When scaled in this manner, the same threshold can be used to evaluate ΔMV regardless of order in which the MVs are considered. Moreover, since only one of ΔPOCa and ΔPOCb will be negative, only one MV will be rotated 180 degrees when the MVs are scaled using equation (9).

The criterion C determines whether both or one of the ΔMV.x and ΔMV.y component of the ΔMV is smaller than a first threshold, i.e. $\Delta MV.x<Threshold1$ and/or $\Delta MV.y<Threshold1$. The refinement is performed when the criterion C is met. Brief reference is made to FIG. 14. As shown therein, the method may generate a similarity metric based on the motion vectors mvA and mvB (block 1402). The similarity metric may include ΔMV.x, ΔMV.y, or a combination of ΔMV.x and ΔMV.y.

In some embodiments, a second threshold may be provided where the second threshold is smaller than the first threshold. The criterion C may determine whether one or both of the components of ΔMV is smaller than the first threshold and greater than the second threshold. The refinement is performed when the criterion C is met.

In some embodiments, the criterion C may include comparing the temporal distances ΔPOC among reference picture refA, the current picture and the reference picture refB. The temporal distances can be computed as described above using the corresponding POC values POC0, POCa and POCb.

The criterion C may include determining whether the absolute POC differences are equal, i.e., $|POCn-POCa|=|POCn-POCb|$, and the refinement is performed when the criterion C is met.

In some embodiments, the criterion C may include determining whether at least one of the following two conditions is satisfied: (a) $|POCn-POCa|\leq Threshold\_1$; (b) $|POCn-POCb|\leq Threshold\_2$. The criterion C is met if one or both of the two conditions are satisfied.

The temporal distance between two pictures is a function of both the POC difference and the frame rate (typically expressed in frames per second, or fps). The thresholds used to evaluate the POC differences and/or the MV differences may be based on a particular frame rate. In some embodiments, the encoder may explicitly signal the thresholds to the decoder in the video bitstream. In other embodiments, the decoder may scale the thresholds based on the frame rate of the video bitstream.

Figure 11:
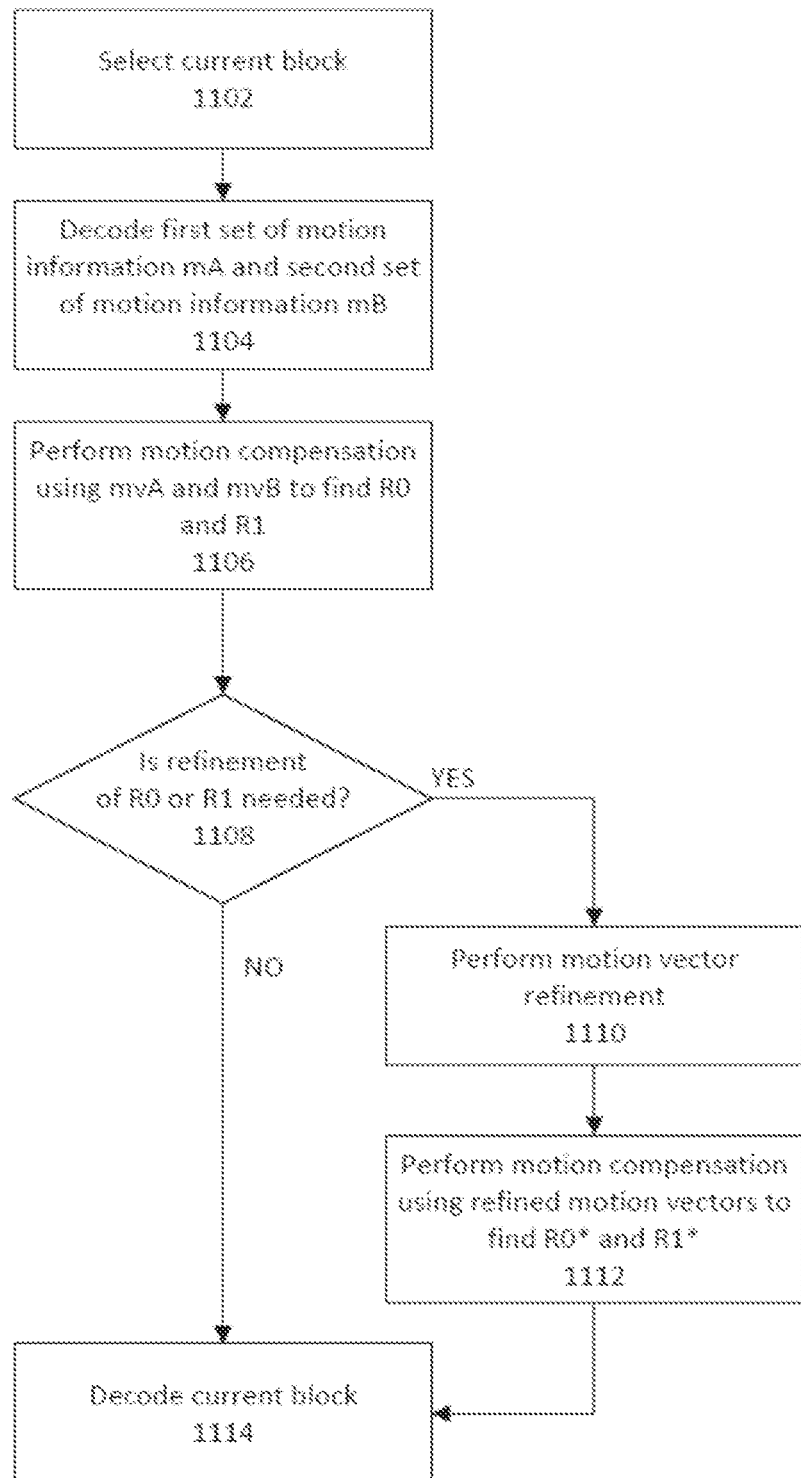

Operations of a decoder 900 according to further embodiments are illustrated in FIG. 11. Referring to FIG. 11, the decoder 900 first selects a current block K in a current picture having POC equal to POCn for processing (block 1102). The current picture is a B-picture that uses bidirectional prediction for decoding.

The decoder 900 then decodes a first set of motion information mA from the video bitstream, where mA contains a motion vector mvA and the first reference picture refA with POC equal to POCa and a second set of motion information mB from the video bitstream, where mB contains a motion vector mvB and reference picture refB with POC equal to POCb (block 1104).

Next, the decoder 900 performs motion compensation using the mvA and mvB to find reference blocks R0 and R1 in the reference pictures refA and refB, respectively (block 1106).

Next, the decoder 900 determines whether further refinement to reference blocks R0 and R1 is needed based on some criterion C (block 1108). The criterion C may in some embodiments be based on a comparison of the reference blocks R0 and R1.

When the criterion C is met, further refinement is carried out for mvA and/or mvB (block 1110). The refinement results in two new motion vectors mvA*, mvB*. These motion vectors mvA* and mvB* are then used in the motion compensation process to derive the corresponding refined reference blocks R0* and R1* for predicting the sample values of the current block K (block 1112).

When the criterion C is not met, no further refinement is carried out. The resulting reference blocks R0 and R1 or R0* and R1* are then used to decode the current block K (block 1114).

Brief reference is made to FIG. 15. As shown therein, the method may include generating a similarity metric based on R0 and R1 (block 1502). The similarity metric may be generated by comparing only a limited set of sample values in R0 and R1, as opposed to performing full SAD. In some embodiments, the criterion compares every m-th and n-th sample values in the x- and y-directions, respectively of the reference blocks R1 and R0 and computes a similarity metric for the reference blocks based on the selected samples. When the similarity is smaller than a first threshold, the refinement may be performed.

In some embodiments, the similarity metric can be generated by comparing the mean or variance of the limited set of samples in R0 and R1. In other embodiments, the SAD of the limited set of samples may be computed. That is, a similarity value may by the SAD method be calculated as the sum of the absolute differences for all co-located sample value pairs having coordinates that are included in the set of coordinates.

In still other embodiments, a mean square error (MSE) may be calculated for the limited set of sample values of R0 and R1.

Encoder Operations

Figure 12:
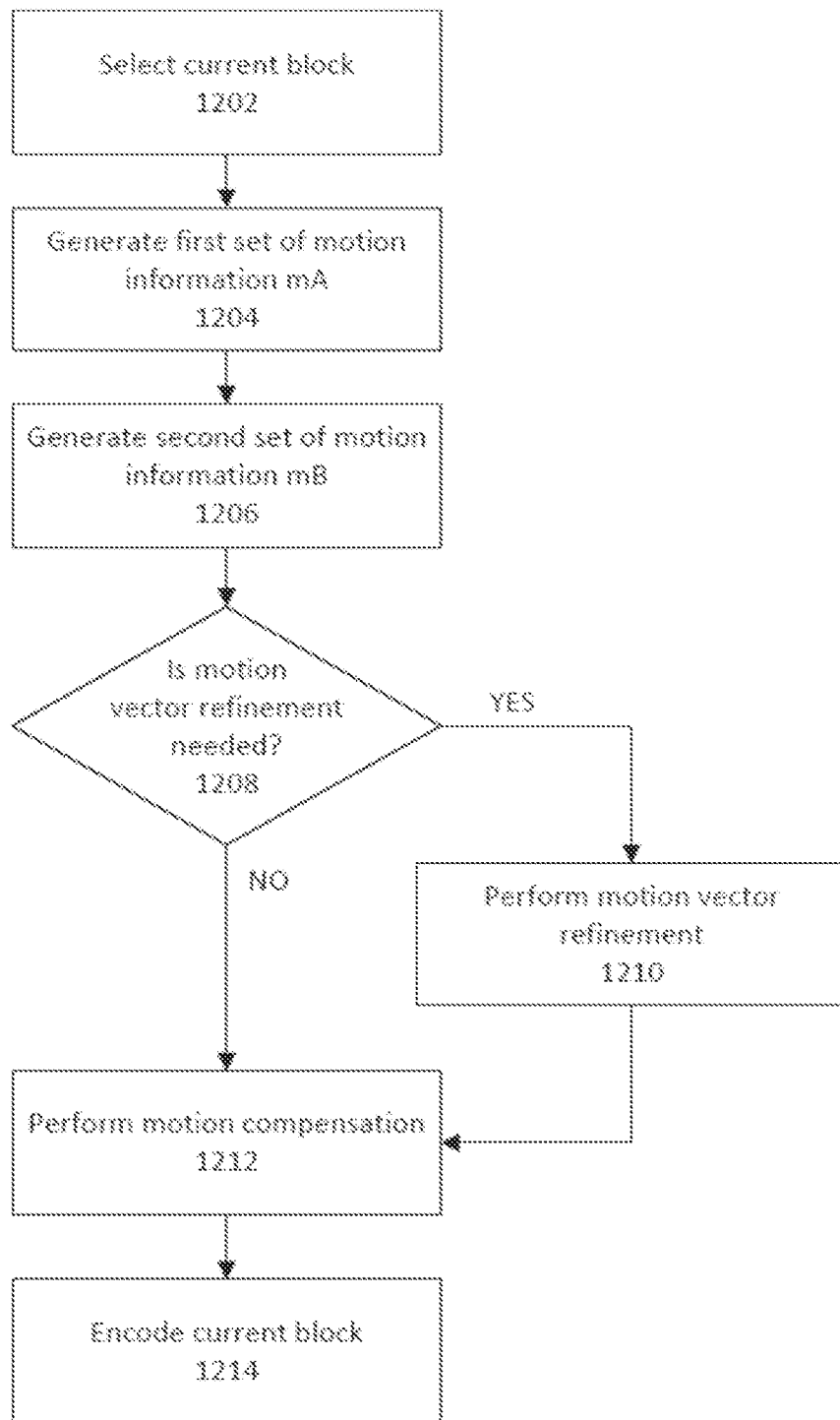

FIG. 12 illustrates operations of an encoder 900 for decoding a video bitstream according to some embodiments. Referring to FIG. 12, the encoder 900 first selects a current block K in a current picture having POC equal to POCn for processing (block 1202). The current picture is a B-picture that uses bidirectional prediction for decoding.

The encoder 900 then generates one set of motion information mA from the video bitstream, where mA contains a motion vector mvA and the first reference picture refA with POC equal to POCa (block 1204).

The encoder 900 then generates another set of motion information mB from the video bitstream, where mB contains a motion vector mvB and reference picture refB with POC equal to POCb (block 1206).

Next, the encoder 900 determines whether further refinement to mvA and/or mvB is needed based on some criterion C (block 1208). The criterion C may in some embodiments be based on a comparison of one or more components of the motion vectors mvA, mvB, including comparison of their x-components, their y-components and/or their z-components (e.g., their ΔPOCs). In other embodiments, the criterion may be based on comparison of the reference blocks associated with the motion vectors.

When the criterion C is met, further refinement is carried out for mvA and/or mvB (block 1210). The refinement results in two new motion vectors mvA*, mvB*. These motion vectors mvA* and mvB* are then used in the motion compensation process to derive the corresponding reference blocks for predicting the sample values of block K (block 1212).

When the criterion C is not met, no further refinement is carried out for mvA and mvB. Both mvA and mvB are directly used in the motion compensation process to find the corresponding reference blocks for predicting the sample values of block K.

Finally, the encoder 900 encodes the current block using the reference blocks (block 1214).

In some embodiments, the criterion C may include comparing the similarity between mvA and mvB. The similarity may be measured as described above by calculating the motion vector difference ΔMV between mvA and mvB, where one of the MVs is rotated by 180 degrees.

In some embodiments, a motion vector scaling according to equation (1) or (9) may be applied when calculating the motion vector difference.

The criterion C determines whether both or one of the ΔMV.x and ΔMV.y component of the ΔMV is smaller than a first threshold, i.e. ΔMV.x<Threshold1 and/or ΔMV.y<Threshold1. The refinement is performed when the criterion C is met.

In some embodiments, a second threshold may be provided where the second threshold is smaller than the first threshold. The criterion C may determine whether both or one of the components of ΔMV is smaller than the first threshold and greater than the second threshold. The refinement is performed when the criterion C is met.

In some embodiments, the criterion C may include comparing the temporal distances ΔPOC among reference picture refA, the current picture and the reference picture refB. The temporal distances can be computed as described above using the corresponding POC values POC0, POCa and POCb.

The criterion C may include determining whether the absolute POC differences are equal, i.e., |POCn−POCa|=|POCn−POCb|, and the refinement is performed when the criterion C is met.

In some embodiments, the criterion C may include determining whether at least one of the following two conditions is satisfied: (a) |POCn−POCa|≤Threshold_1; (b) |POCn−POCb|≤Threshold_2. The criterion C is met if one or both of the two conditions are satisfied.

In some embodiments, the encoder may explicitly signal the thresholds to the decoder in the video bitstream. In other embodiments, the decoder may signal the frame rate or a scale factor that the decoder can use to scale the thresholds based on the frame rate of the video bitstream.

Figure 13:
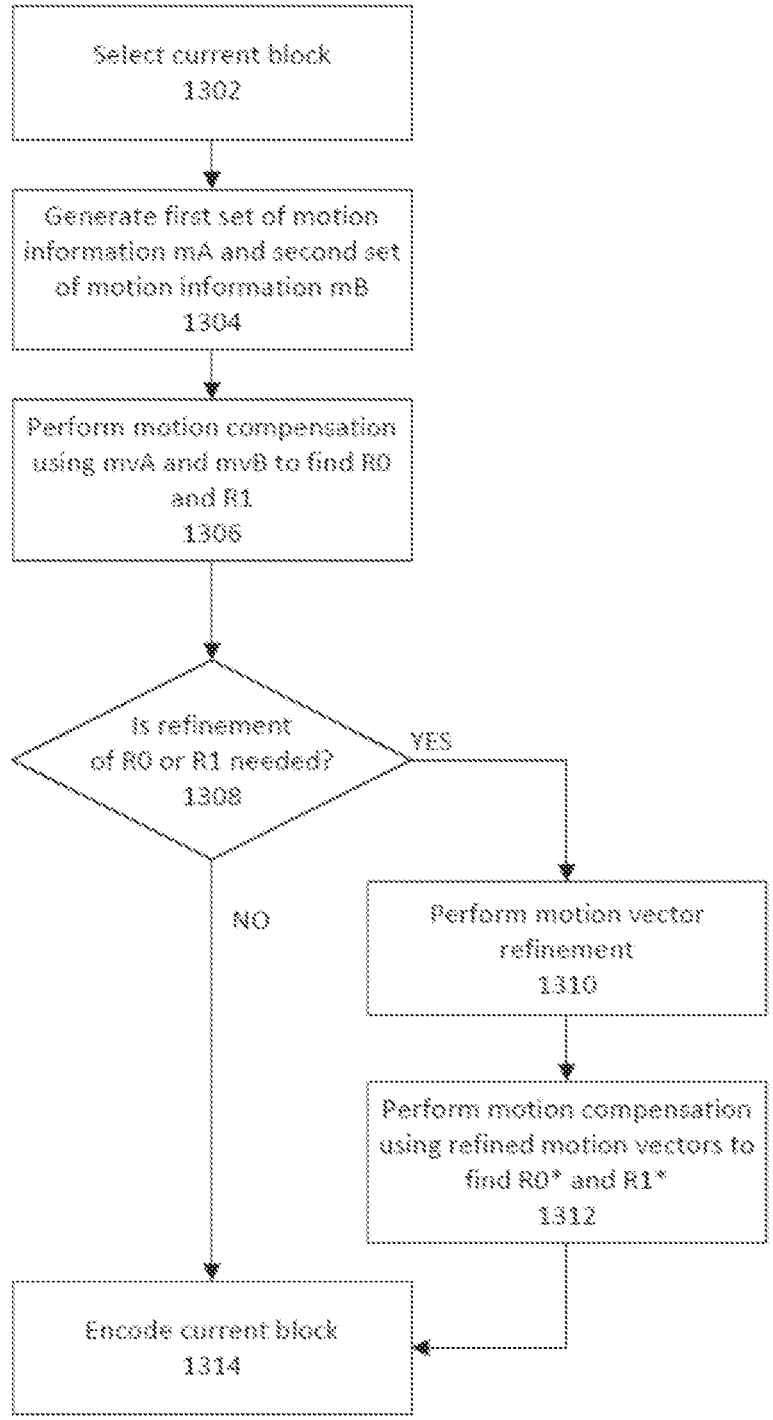

Operations of an encoder 900 according to further embodiments are illustrated in FIG. 13. Referring to FIG. 13, the encoder 900 first selects a current block K in a current picture having POC equal to POCn for processing (block 1302). The current picture is a B-picture that uses bidirectional prediction for decoding.

The encoder 900 then generates a first set of motion information mA from the video bitstream, where mA contains a motion vector mvA and the first reference picture refA with POC equal to POCa, and a second set of motion information mB from the video bitstream, where mB contains a motion vector mvB and reference picture refB with POC equal to POCb (block 1304).

Next, the encoder 900 performs motion compensation using the mvA and mvB to find reference blocks R0 and R1 in the reference pictures refA and refB, respectively (block 1306).

Next, the encoder 900 determines whether further refinement to reference blocks R0 and R1 is needed based on some criterion C (block 1308). The criterion C may in some embodiments be based on a comparison of the reference blocks R0 and R1.

When the criterion C is met, further refinement is carried out for mvA and/or mvB (block 1310). The refinement results in two new motion vectors mvA*, mvB*. These motion vectors mvA* and mvB* are then used in the motion compensation process to derive the corresponding refined reference blocks R0* and R1* for predicting the sample values of the current block K (block 1312).

When the criterion C is not met, no further refinement is carried out. The resulting reference blocks R0 and R1 or R0* and R1* are then used to encode the current block K (block 1314).

In this embodiment, the criterion C may include comparing only a limited set of sample values in R0 and R1, as opposed to performing full SAD. In some embodiments, the criterion compares every m-th and n-th sample values in the x- and y-directions, respectively of the reference blocks R1 and R0 and computes a similarity metric for the reference blocks. When the similarity is smaller than a first threshold, the refinement may be performed.

In some embodiments, the similarity metric can be generated by comparing the mean or variance of the limited set of samples in R0 and R1. In other embodiments, the SAD of the limited set of samples may be computed. That is, a similarity value may by the SAD method be calculated as the sum of the absolute differences for all co-located sample value pairs having coordinates that are included in the set of coordinates.

In still other embodiments, a mean square error (MSE) may be calculated for the limited set of sample values of R0 and R1.

REFERENCES

[1] A. Alshin, and E. Alshina, "Bi-directional optical flow," Joint Collaborative Team on Video Coding (JCT-VC) of ITU-T SG16 WP3 and ISO/IEC JTC1/SC29/WG11, JCTVC-C204, Guangzhou, China, 10-15 Oct. 2010.

[2] A., Alexander, and E. Alshina, "Bi-directional optical flow for future video codec." In Data Compression Conference (DCC), 2016, pp. 83-90. IEEE, 2016.

[3] X. Xiu, Y. He, Y. Ye, "CE9-related: Complexity reduction and bit-width control for bi-directional optical flow (BIO)", Input document to JVET, document number JVET-L0256.

The invention claimed is:

1. A method, performed by a decoder, for decoding a current block in a current picture of a video bitstream, the current picture having a current picture order count, the method comprising:

decoding, from the video bitstream, a first motion vector for the current block relative to a first reference block of a first reference picture having a first picture order count;

decoding, from the video bitstream, a second motion vector for the current block relative to a second reference block of a second reference picture having a second picture order count, wherein the first and second motion vectors each comprise a three-dimensional motion vector including an x-component in a plane of the current picture, a y-component in the plane of the current picture and a z-component, wherein the z-component represents a time component;

determining whether to refine the first motion vector based on comparing a difference between the z-components of the first and second motion vectors to a third threshold, and determining to refine the first motion vector in response to the difference between the z-components of the first and second motion vectors being less than the third threshold;

responsive to determining to refine the first motion vector, generating a first refined motion vector from the first motion vector; and performing motion compensation to derive an updated first reference block from the first reference picture using the first refined motion vector.

2. The method of claim 1, wherein determining whether to refine the first motion vector further comprises comparing a difference between the x-components of the first and second motion vectors to a first threshold and determining to refine the first motion vector in response to the difference between the x-components of the first and second motion vectors being less than the first threshold.

3. The method of claim 2, further comprising generating the difference between the x-components of the first and second motion vectors based on a difference between an absolute value of the x-component of the first motion vector and an absolute value of the x-component of the second motion vector.

4. The method of claim 1, wherein determining whether to refine the first motion vector further comprises comparing a difference between the y-components of the first and second motion vectors to a second threshold and determining to refine the first motion vector in response to the difference between the y-components of the first and second motion vectors being less than the second threshold.

5. The method of claim 4, further comprising generating the difference between the y-components of the first and second motion vectors based on a difference between an absolute value of the y-component of the first motion vector and an absolute value of the y-component of the second motion vector.

6. The method of claim 1, wherein the z-component of the first motion vector comprises a difference between the current picture order count and the first picture order count, and the z-component of the second motion vector comprises a difference between the current picture order count and the second picture order count; and further comprising generating the difference between the z-components of the first and second motion vectors based on a difference between an absolute value of the z-component of the first motion vector and an absolute value of the z-component of the second motion vector.

7. A method, performed by a decoder, for decoding a current block in a current picture of a video bitstream, the current picture having a current picture order count, the method comprising:
  decoding, from the video bitstream, a first motion vector for the current block relative to a first reference block of a first reference picture having a first picture order count;
  decoding, from the video bitstream, a second motion vector for the current block relative to a second reference block of a second reference picture having a second picture order count;
  determining whether to refine the first motion vector based on determining whether an absolute difference between the current picture order count and the first picture order count is equal to an absolute difference between the current picture order count and the second picture order count;
  responsive to determining to refine the first motion vector, generating a first refined motion vector from the first motion vector; and
  performing motion compensation to derive an updated first reference block from the first reference picture using the first refined motion vector.

8. The method of claim 7, wherein generating the first refined motion vector comprises performing bi-directional optical flow, BIO, processing on the first motion vector.

9. The method of claim 7, wherein generating the first refined motion vector comprises performing decoder-side motion vector refinement, DMVR, processing on the first motion vector.

10. The method of claim 7, further comprising:
  scaling the first motion vector or the second motion vector based on the first picture order count, the second picture order count and the current picture order count.

11. A decoder for decoding a current block in a current picture of a video bitstream, the current picture having a current picture order count, the decoder comprising:
  a processor circuit; and
  a memory coupled with the processor circuit, wherein the memory comprises instructions that when executed by the processor circuit cause the processor circuit to perform operations comprising,
    decode, from the video bitstream, a first motion vector for the current block relative to a first reference block of a first reference picture having a first picture order count;
    decode, from the video bitstream, a second motion vector for the current block relative to a second reference block of a second reference picture having a second picture order count, wherein the first and second motion vectors each comprise a three-dimensional motion vector including an x-component in a plane of the current picture, a y-component in the plane of the current picture and a z-component, wherein the z-component represents a time component;
    determine whether to refine the first motion vector based on comparing a difference between the z-components of the first and second motion vectors to a third threshold, and determining to refine the first motion vector in response to the difference between the z-components of the first and second motion vectors being less than the third threshold;
    responsive to determining to refine the first motion vector, generate a first refined motion vector from the first motion vector; and
    perform motion compensation to derive an updated first reference block from the first reference picture using the first refined motion vector.

12. The decoder of claim 11, wherein the operation for determining whether to refine the first motion vector further comprises comparing a difference between the x-components of the first and second motion vectors to a first threshold and determining to refine the first motion vector in response to the difference between the x-components of the first and second motion vectors being less than the first threshold.

13. The decoder of claim 12, wherein the operations further comprise generating the difference between the x-components of the first and second motion vectors based on a difference between an absolute value of the x-component of the first motion vector and an absolute value of the x-component of the second motion vector.

14. The decoder of claim 11, wherein the operations for determining whether to refine the first motion vector further comprises comparing a difference between the y-components of the first and second motion vectors to a second threshold and determining to refine the first motion vector in response to the difference between the y-components of the first and second motion vectors being less than the second threshold.

15. The decoder of claim 14, wherein the operations further comprise generating the difference between the y-components of the first and second motion vectors based on a difference between an absolute value of the y-component of the first motion vector and an absolute value of the y-component of the second motion vector.

16. The decoder of claim 11, wherein the z-component of the first motion vector comprises a difference between the current picture order count and the first picture order count, and the z-component of the second motion vector comprises a difference between the current picture order count and the second picture order count; and
  the operations further comprise generating the difference between the z-components of the first and second motion vectors based on a difference between an absolute value of the z-component of the first motion vector and an absolute value of the z-component of the second motion vector.

17. A decoder for decoding a current block in a current picture of a video bitstream, the current picture having a current picture order count, the decoder comprising:
  a processor circuit; and
  a memory coupled with the processor circuit, wherein the memory comprises instructions that when executed by the processor circuit cause the processor circuit to perform operations comprising,
    decode, from the video bitstream, a first motion vector for the current block relative to a first reference block of a first reference picture having a first picture order count;
    decode, from the video bitstream, a second motion vector for the current block relative to a second reference block of a second reference picture having a second picture order count;
    determine whether to refine the first motion vector based on determining whether an absolute difference between the current picture order count and the first picture order count is equal to an absolute difference between the current picture order count and the second picture order count;

responsive to determining to refine the first motion vector, generate a first refined motion vector from the first motion vector; and perform motion compensation to derive an updated first reference block from the first reference picture using the first refined motion vector.

18. The decoder of claim 17, wherein the operation for generating the first refined motion vector comprises performing bi-directional optical flow, BIO, processing on the first motion vector.

19. The decoder of claim 17, wherein the operation for generating the first refined motion vector comprises performing decoder-side motion vector refinement, DMVR, processing on the first motion vector.

20. The decoder of claim 17, wherein the operations further comprise:

scaling the first motion vector or the second motion vector based on the first picture order count, the second picture order count and the current picture order count.

21. A method, performed by an encoder, for encoding a current block in a current picture of a video bitstream, the current picture having a current picture order count, the method comprising:

generating a first motion vector for the current block relative to a first reference block of a first reference picture having a first picture order count;

generating a second motion vector for the current block relative to a second reference block of a second reference picture having a second picture order count, wherein the first and second motion vectors each comprise a three-dimensional motion vector including an x-component in a plane of the current picture, a y-component in the plane of the current picture and a z-component, wherein the z-component represents a time component;

determining whether to refine the first motion vector based on comparing a difference between the z-components of the first and second motion vectors to a third threshold, and determining to refine the first motion vector in response to the difference between the z-components of the first and second motion vectors being less than the third threshold;

responsive to determining to refine the first motion vector, generating a first refined motion vector from the first motion vector; and performing motion compensation to derive an updated first reference block from the first reference picture using the first refined motion vector.

22. The method of claim 21, wherein determining whether to refine the first motion vector further comprises comparing a difference between the x-components of the first and second motion vectors to a first threshold and determining to refine the first motion vector in response to the difference between the x-components of the first and second motion vectors being less than the first threshold.

23. The method of claim 22, further comprising generating the difference between the x-components of the first and second motion vectors based on a difference between an absolute value of the x-component of the first motion vector and an absolute value of the x-component of the second motion vector.

24. The method of claim 21, wherein determining whether to refine the first motion vector further comprises comparing a difference between the y-components of the first and second motion vectors to a second threshold and determining to refine the first motion vector in response to the difference between the y-components of the first and second motion vectors being less than the second threshold.

25. The method of claim 24, further comprising generating the difference between the y-components of the first and second motion vectors based on a difference between an absolute value of the y-component of the first motion vector and an absolute value of the y-component of the second motion vector.

26. The method of claim 21, wherein the z-component of the first motion vector comprises a difference between the current picture order count and the first picture order count, and the z-component of the second motion vector comprises a difference between the current picture order count and the second picture order count; and further comprising generating the difference between the z-components of the first and second motion vectors comprises generating a difference between an absolute value of the z-component of the first motion vector and an absolute value of the z-component of the second motion vector.

27. The method of claim 21, wherein generating the first refined motion vector comprises performing bi-directional optical flow, BIO, processing on the first motion vector.

28. A computer program product comprising a non-transitory computer readable medium storing computer-executable instructions executable by a processor of a computing device configured to:

decode, from the video bitstream, a first motion vector for the current block relative to a first reference block of a first reference picture having a first picture order count;

decode, from the video bitstream, a second motion vector for the current block relative to a second reference block of a second reference picture having a second picture order count;

determine whether to refine the first motion vector based on determining whether an absolute difference between the current picture order count and the first picture order count is equal to an absolute difference between the current picture order count and the second picture order count;

responsive to determining to refine the first motion vector, generate a first refined motion vector from the first motion vector; and perform motion compensation to derive an updated first reference block from the first reference picture using the first refined motion vector.

* * * * *